(12) United States Patent
Zevenbergen et al.

(10) Patent No.: US 9,776,326 B2
(45) Date of Patent: Oct. 3, 2017

(54) BATTERY AND HARD DRIVE EXCHANGE STATION FOR ROBOTS

(71) Applicant: X Development LLC, Mountain View, CA (US)

(72) Inventors: John William Zevenbergen, San Francisco, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 62 days.

(21) Appl. No.: 14/876,947

(22) Filed: Oct. 7, 2015

(65) Prior Publication Data

US 2017/0100837 A1    Apr. 13, 2017

(51) Int. Cl.
| | |
|---|---|
| G05B 19/18 | (2006.01) |
| B25J 9/16 | (2006.01) |
| B25J 5/00 | (2006.01) |
| B25J 19/00 | (2006.01) |

(52) U.S. Cl.
CPC ............... B25J 9/1674 (2013.01); B25J 5/00 (2013.01); B25J 9/1664 (2013.01); B25J 19/005 (2013.01); *Y10S 901/01* (2013.01); *Y10S 901/50* (2013.01)

(58) Field of Classification Search
USPC ................................................. 700/245, 253
See application file for complete search history.

(56) References Cited

U.S. PATENT DOCUMENTS

| | | | |
|---|---|---|---|
| 5,239,931 A | 8/1993 | Muselli et al. | |
| 6,498,454 B1 | 12/2002 | Pinlam et al. | |
| 6,909,940 B2 | 6/2005 | Hellman et al. | |
| 7,011,171 B1 * | 3/2006 | Poulter | ................. B60B 15/023 180/65.1 |
| 7,602,143 B2 | 10/2009 | Capizzo | |

(Continued)

FOREIGN PATENT DOCUMENTS

CN          102887363 A      1/2013

OTHER PUBLICATIONS

Kurt A. Swieringa, et al.; "Autonomous Battery Swapping System for Small-Scale Helicopters"; 2010 IEEE International Conference on Robotics and Automation; Anchorage Convention District; May 3-8, 2010, Anchorage, Alaska, USA; p. 3335-3340.

*Primary Examiner* — Ronnie Mancho
(74) *Attorney, Agent, or Firm* — McDonnell Boehnen Hulbert & Berghoff LLP

(57) ABSTRACT

An example method includes receiving, by a mobile robotic device, power from a battery of a first battery pack in order to operate within an environment. The method further includes establishing a first data channel between the mobile robotic device and the first battery pack. The method also includes using the first data channel to transfer sensor data acquired by the mobile robotic device during operation to a local data storage component of the first battery pack. The method additionally includes navigating, by the mobile robotic device, to a battery exchange station to transfer the first battery pack containing the battery and the local data storage component with the sensor data to the battery exchange station. The method further includes after transferring the first battery pack to the battery exchange station, receiving a second battery pack from the battery exchange station to continue operation within the environment.

20 Claims, 13 Drawing Sheets

(56) References Cited

U.S. PATENT DOCUMENTS

| | | | |
|---|---|---|---|
| 2004/0093650 A1* | 5/2004 | Martins | B25J 5/007 |
| | | | 180/167 |
| 2010/0138095 A1 | 6/2010 | Redman, Jr. et al. | |
| 2010/0141206 A1* | 6/2010 | Agassi | B60K 1/04 |
| | | | 320/109 |
| 2011/0106294 A1 | 5/2011 | Bebbington | |
| 2011/0246014 A1* | 10/2011 | Sauper | B60L 11/1818 |
| | | | 701/22 |
| 2012/0323365 A1 | 12/2012 | Taylor et al. | |
| 2013/0009592 A1 | 1/2013 | Larsen et al. | |
| 2013/0259456 A1* | 10/2013 | Viswanathan | F24D 13/00 |
| | | | 392/407 |
| 2014/0110183 A1* | 4/2014 | Rudakevych | B60K 7/0007 |
| | | | 180/9.32 |
| 2014/0321236 A1* | 10/2014 | Lelaurin | E02D 29/06 |
| | | | 367/15 |
| 2015/0239365 A1* | 8/2015 | Hyde | B60L 11/1861 |
| | | | 701/2 |

* cited by examiner

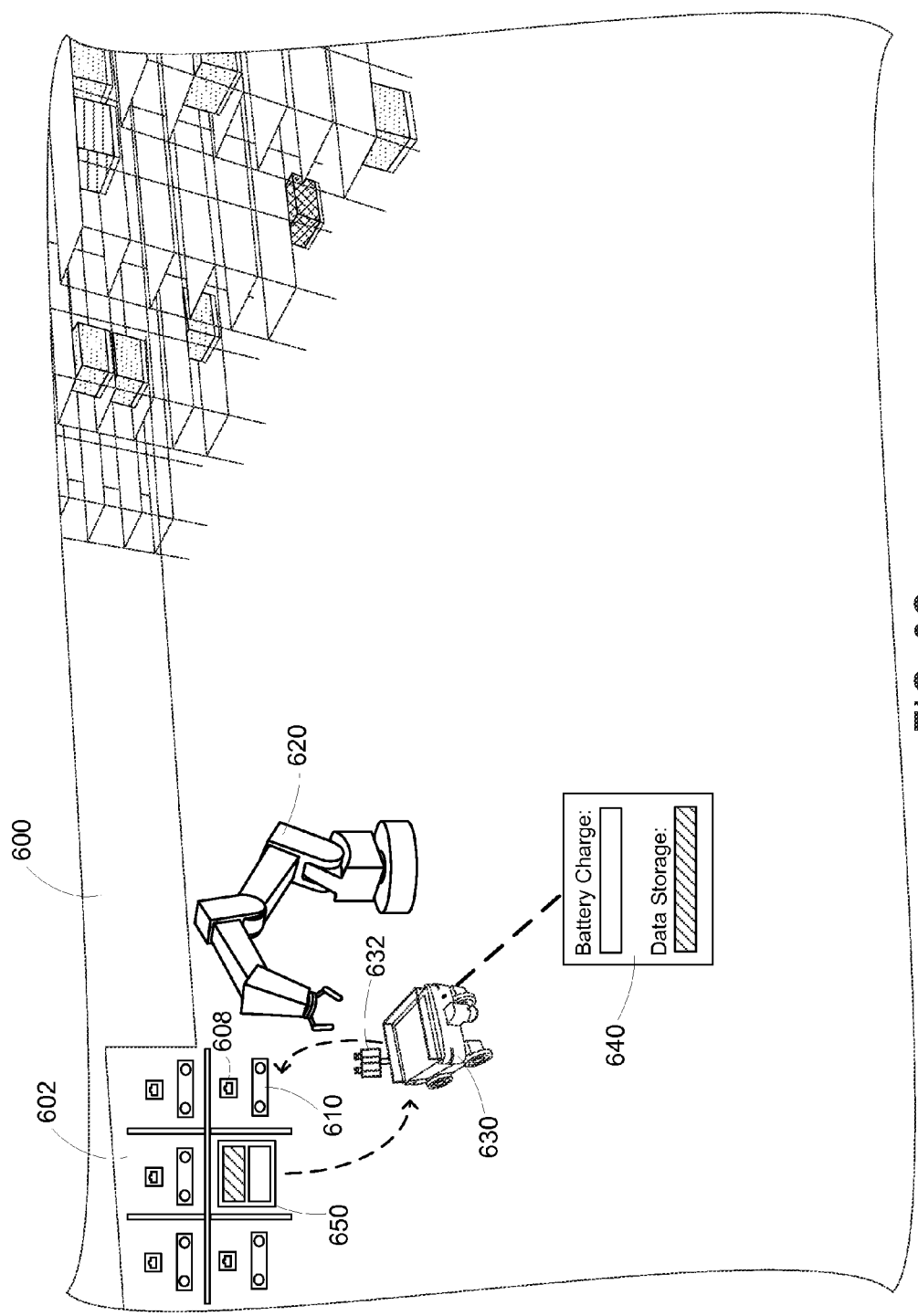

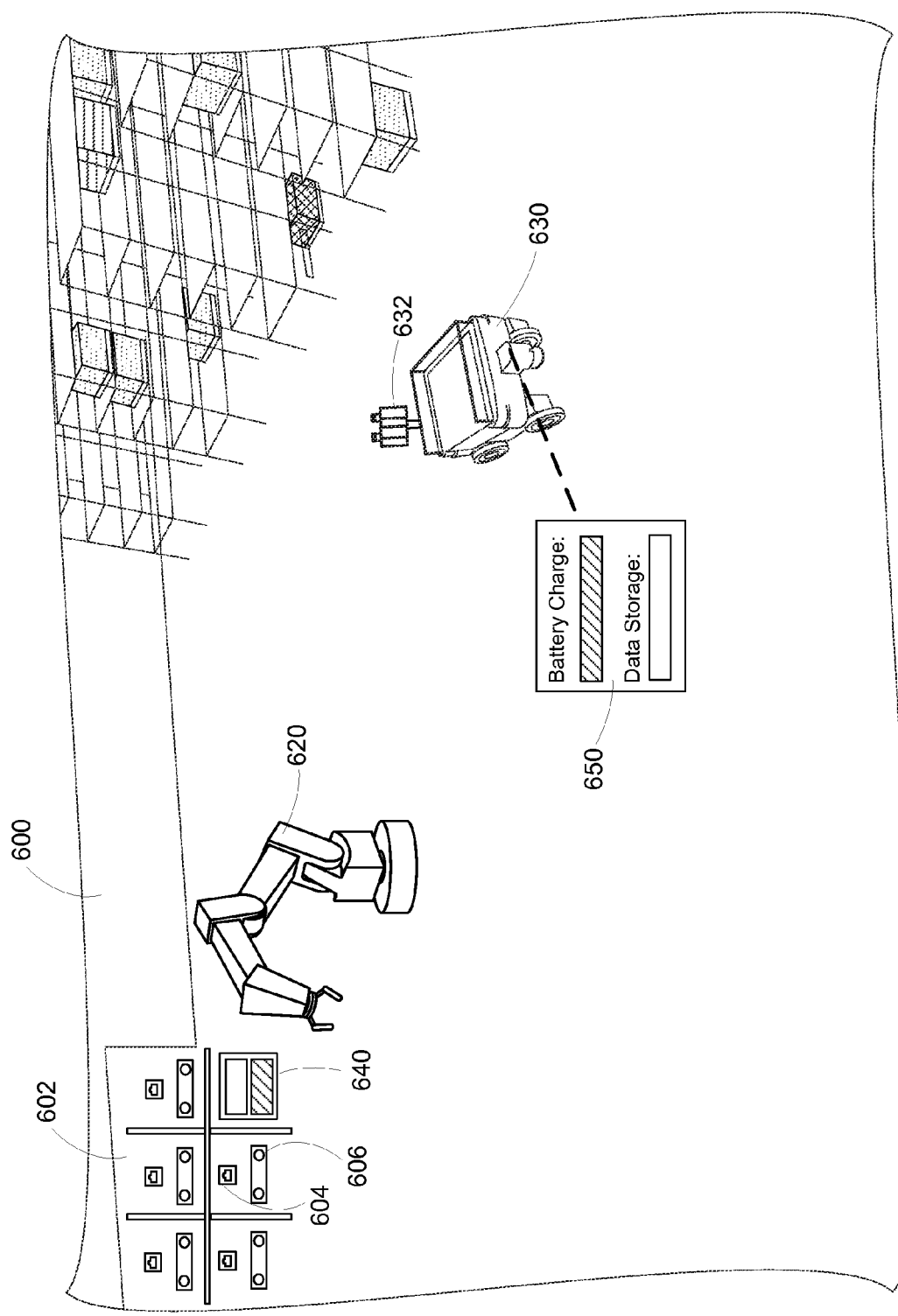

BATTERY AND HARD DRIVE EXCHANGE STATION FOR ROBOTS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods relate to exchangeable battery packs for mobile robots. A battery pack may include a rechargeable battery as well as a local data storage component. The battery may provide power to a robot as the local data storage component receives and stores sensor data acquired by the robot. Once the battery is depleted and/or the local data storage component is filled, the battery pack may be transferred to a battery exchange station. At the exchange station, the battery may be recharged while the sensor data stored on the local data storage component of the battery pack is recovered and erased. Once the battery pack has a fully charged battery and empty data storage component, it may be redeployed to another mobile robot.

In one example, a method is provided that includes receiving, by a mobile robotic device, power from a battery of a first battery pack in order to operate within an environment. The method further includes establishing, by the mobile robotic device, a first data channel between the mobile robotic device and the first battery pack. The method also includes using the first data channel to transfer sensor data acquired by the mobile robotic device during operation to a local data storage component of the first battery pack. The method additionally includes navigating, by the mobile robotic device, to a battery exchange station to transfer the first battery pack containing the battery and the local data storage component with the sensor data to the battery exchange station. The method further includes after transferring the first battery pack to the battery exchange station, receiving a second battery pack from the battery exchange station to continue operation within the environment.

In another example, a battery exchange station is disclosed, including a data storage system, a plurality of ports for receiving battery packs from mobile robotic devices, and a control system. A port includes a battery charger to charge a battery of a battery pack that is coupled to the port and a communication interface to transfer data from a local data storage component of the battery pack to the data storage system. The control system is configured to cause the communication interface of a given port of the plurality of ports to establish a data channel with a given battery pack that is coupled to the given port. The control system is further configured to use the data channel to transfer stored data from a local data storage component of the given battery pack to the data storage system while a battery of the given battery pack is charged by the battery charger of the given port.

In another example, a battery pack is disclosed, including a battery configured to provide power to a robot, a local data storage component configured to store data acquired during robotic operation, and a controller. The controller may be configured to establish a first data channel between the battery pack and a given robot while the battery pack is physically coupled to the given robot such that the battery of the battery pack provides power to the given robot. The controller may be further configured to use the first data channel to transfer data from the given robot to the local data storage component of the battery pack for storage. The controller may additionally be configured to establish a second data channel between the battery pack and a battery exchange station while the battery pack is physically coupled to the battery exchange station such that the battery of the battery pack is charged by the battery exchange station. The controller may be further configured to use the second data channel to transfer the data stored in the local data storage component of the battery pack to the battery exchange station.

In yet another example, a system may include means for receiving, by a mobile robotic device, power from a battery of a first battery pack in order to operate within an environment. The system further includes means for establishing, by the mobile robotic device, a first data channel between the mobile robotic device and the first battery pack. The system also includes means for using the first data channel to transfer sensor data acquired by the mobile robotic device during operation to a local data storage component of the first battery pack. The system additionally includes means for navigating, by the mobile robotic device, to a battery exchange station to transfer the first battery pack containing the battery and the local data storage component with the sensor data to the battery exchange station. The system further includes means for after transferring the first battery pack to the battery exchange station, receiving a second battery pack from the battery exchange station to continue operation within the environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIGS. 6A-6D illustrate a mobile robot operating within a building that includes a battery exchange station, according to an example embodiment.

DETAILED DESCRIPTION

Figure 1A:
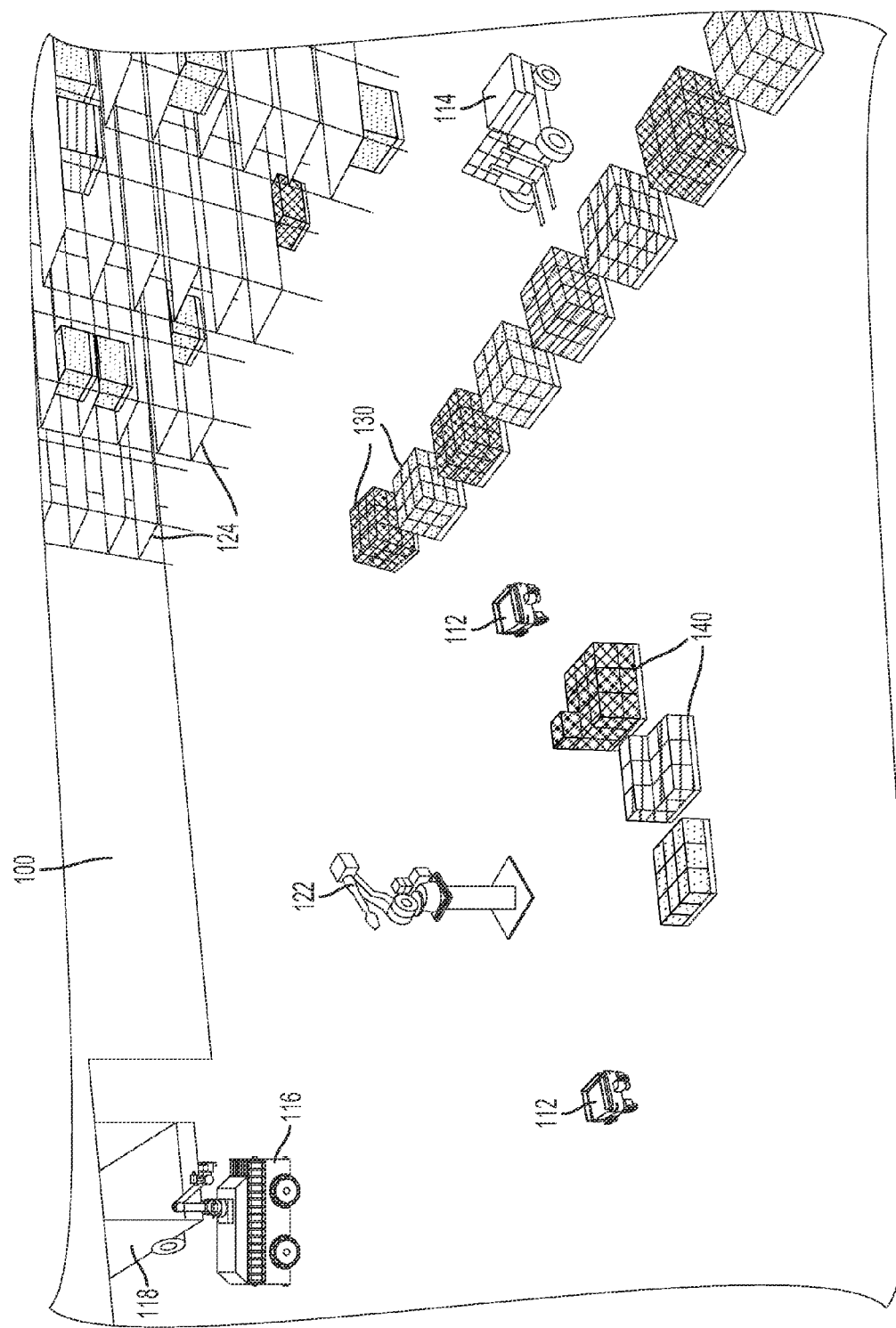
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Within examples, a battery exchange station may be equipped with multiple battery chargers to provide charged batteries for mobile robots within a fleet of robots. In particular, the station may replace a mobile robot's old batteries with recharged batteries, which may prevent robots from having to sit and wait for batteries to charge. Additionally, the battery exchange station may also contain communication interfaces (e.g., high-bandwidth Ethernet connections) to download data off of hard drives that are coupled to batteries that are being recharged at the battery exchange station. This arrangement may allow for the transfer of data acquired during robotic operation to a data storage system at the battery exchange station. The data storage system may be a central data storage system for a fleet of robots, which allows data to be transferred from multiple robots to a single central location without relying on wireless communication channels. Alternatively, the data storage system at the battery exchange station may locally cache data transferred from the robots, and then upload the data to a central data storage system over a wireless channel at a rate that does not interfere with other network traffic.

According to an example embodiment, each mobile robotic device within a fleet may be provided with a battery pack that includes a battery, a hard drive, and a controller. The battery provides power to the robotic device as the robotic device operates within a space. The controller establishes a data channel between a particular robotic device that is carrying the battery pack and the hard drive on the battery pack. The data channel may be used to transfer data acquired by the robotic device (e.g., sensor data or log data) to the hard drive of the battery pack for storage. When the battery of a battery pack is depleted (or nearly depleted) and/or when the hard drive of the battery pack is full (or nearly full), the robotic device may navigate to a battery exchange station.

At the battery exchange station, the battery pack including both the battery and the hard drive may be removed from the robotic device and attached to an available port at the station. The port may include a battery charger to charge the battery of the battery pack and a data communication interface to simultaneously download data from the hard drive of the battery pack. In one example, the battery exchange station may be equipped with a robotic manipulator such as a robotic arm to remove battery packs from individual mobile robots and attach the battery packs to available ports. The robotic manipulator may then also be controlled to select a replacement battery pack with a charged battery and emptied hard drive located at the station, and attach the replacement battery pack to the mobile robot. For instance, an autonomous guided vehicle (AGV) with a battery pack that includes a weak battery and little remaining hard drive space may be controlled to navigate to a battery exchange station where a robotic arm pulls the battery pack from the AGV, attaches the battery pack to an available port, and provides the AGV with a new battery pack containing a fully charged battery and empty hard drive.

The controller of a battery pack may establish a data channel to transfer data stored in the hard drive of the battery pack to the battery exchange station. For instance, the controller may use a gigabit Ethernet interface on the battery pack to transfer the data off of the hard drive in the battery pack. By allowing for the capture of data from hard drives of battery packs through hardline connections at the battery exchange station, the robotic devices within a fleet may not need to store much of the data acquired during operation themselves. For instance, data acquired from sensors such as cameras on the robots may initially be processed by robot control systems and then relayed to the hard drives on the battery packs for storage and eventual transfer to a battery exchange station. Certain information needed by the robot to continue operation (e.g., mapping data) may be stored in a separate location that stays with the robot.

In some examples, a fleet may contain a number of different types of mobile robots that use different types of batteries. A battery exchange station may therefore be equipped with different types of battery chargers for different types of batteries and/or mobile robots. Additionally, the size of a hard drive within a given battery pack may correspond to the battery life of the battery within the battery pack. In particular, the hard drive may be large enough to store data acquirable (or expected to be acquired) by a robot in an amount time indicated by the battery life.

In further examples, the system may also automate battery management strategies. Each battery pack may have an AR code or barcode so the system can identify individual battery packs. A control system of the battery exchange station may count how many times individual batteries have been recharged (e.g., to determine when to change water or empty batteries completely). The control system may also keep track of which batteries have spent time in which robotic devices, how long the batteries took to recharge at the station in the past, and other relevant properties for efficient battery management. This battery usage information may be used by the control system to select battery packs to provide to particular mobile robots.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
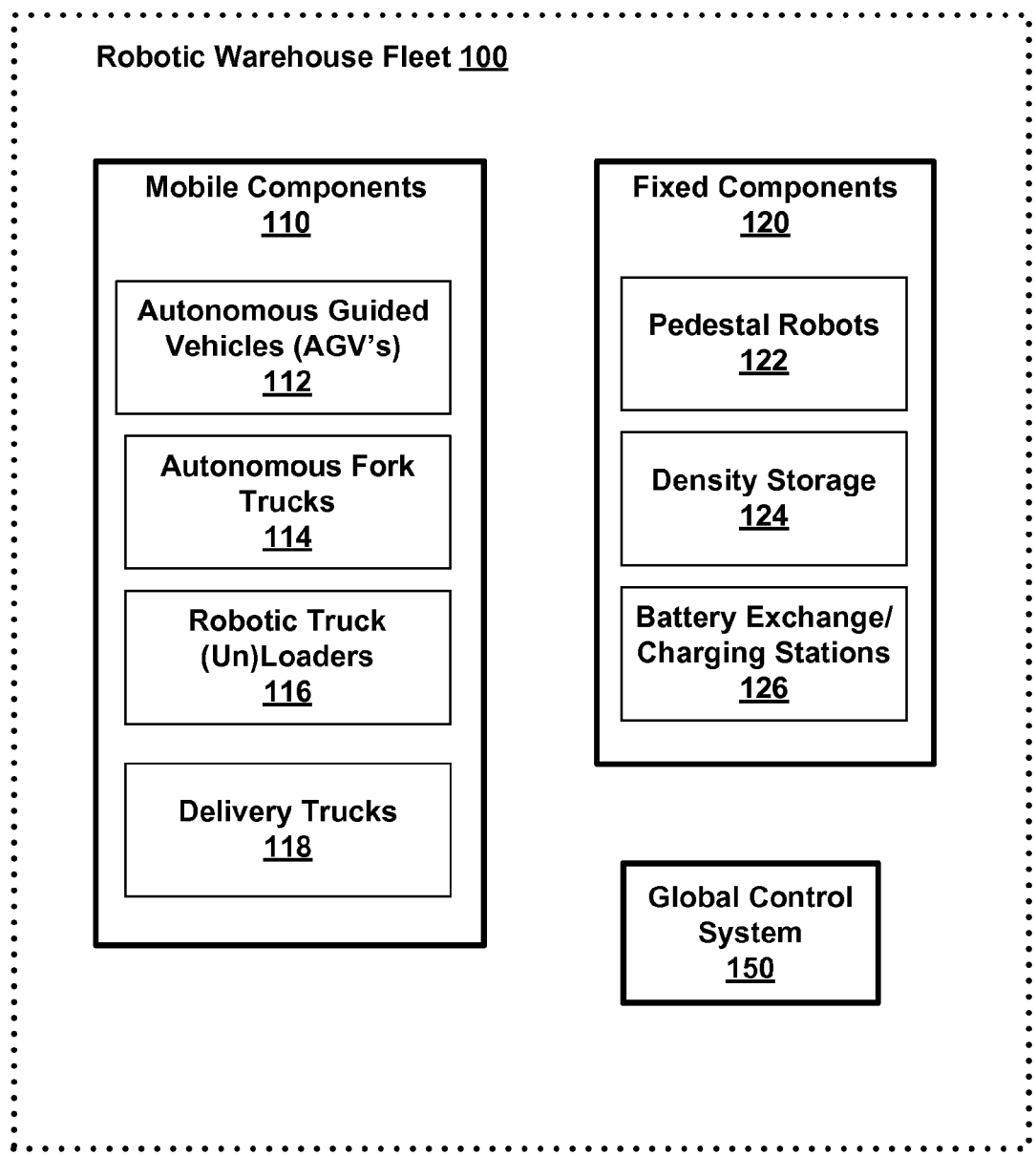
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
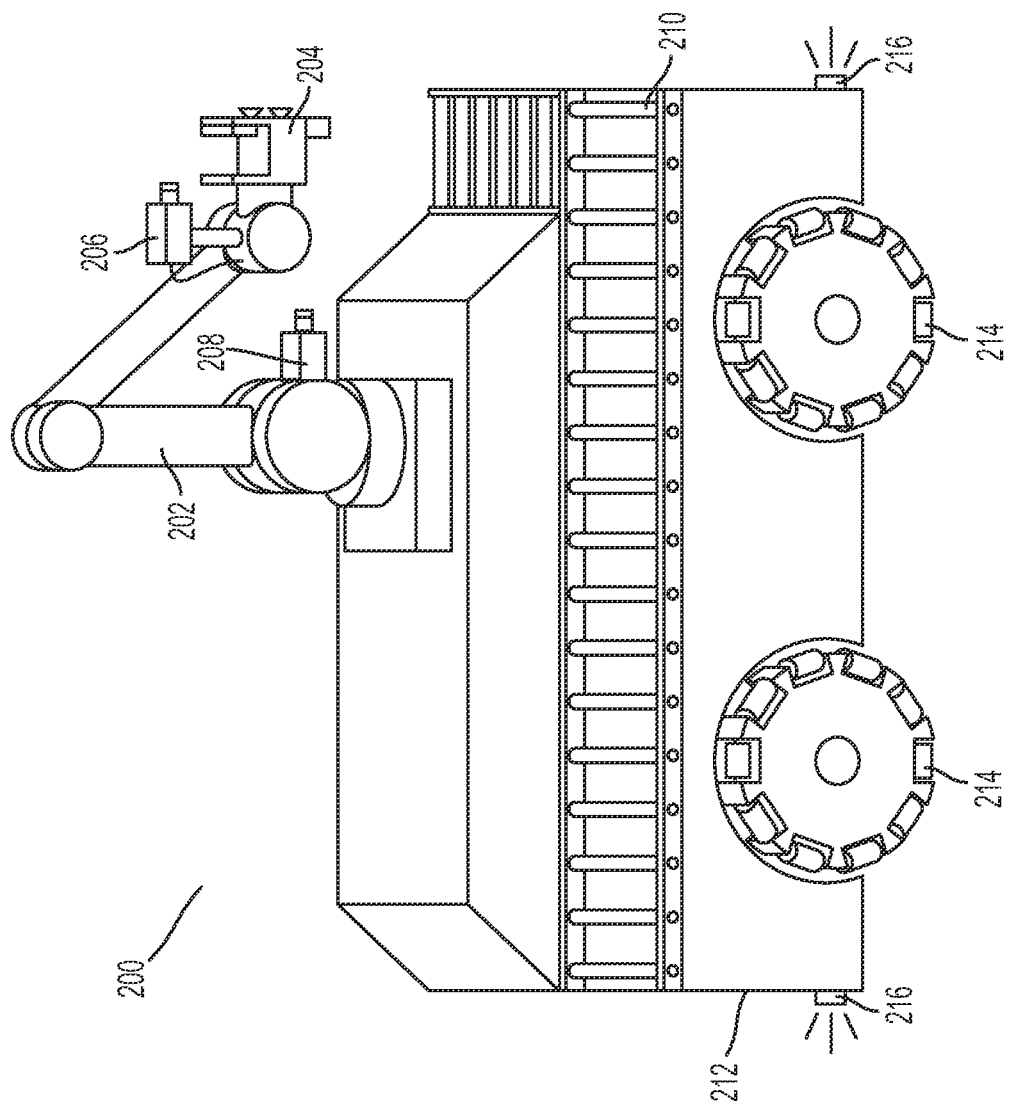
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
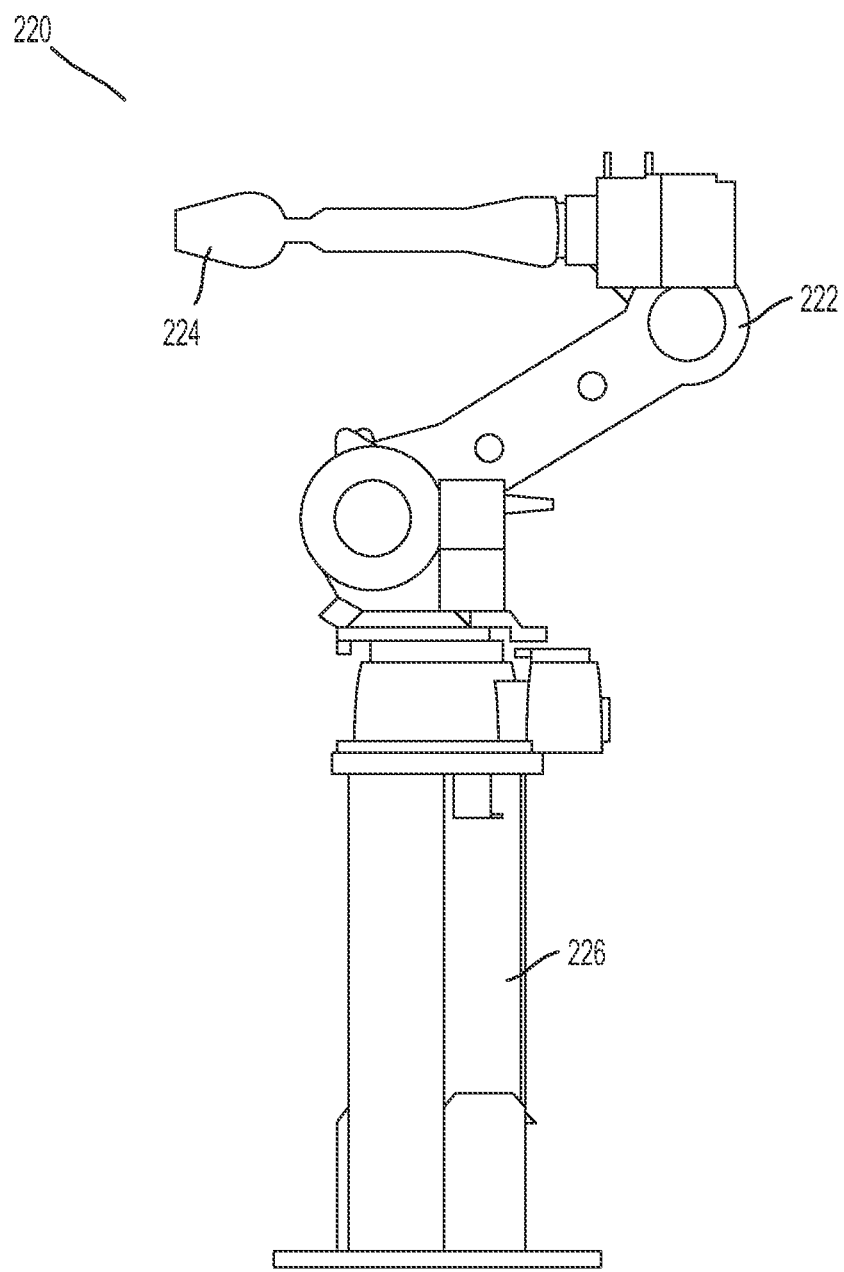
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
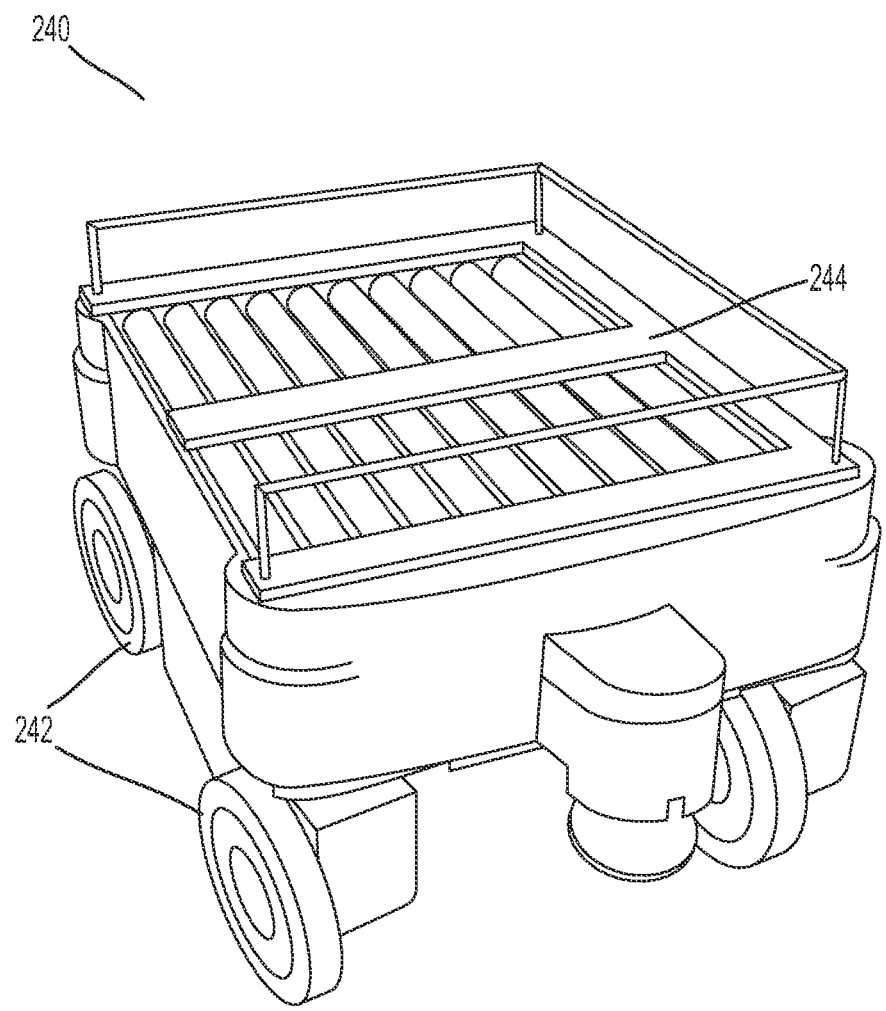
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
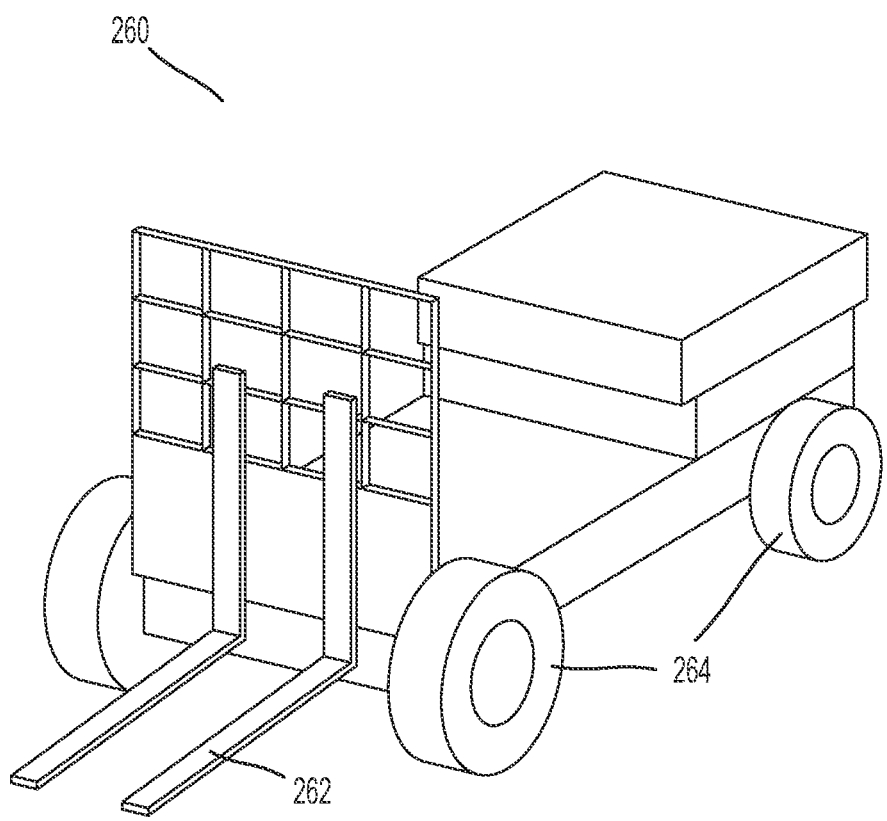
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
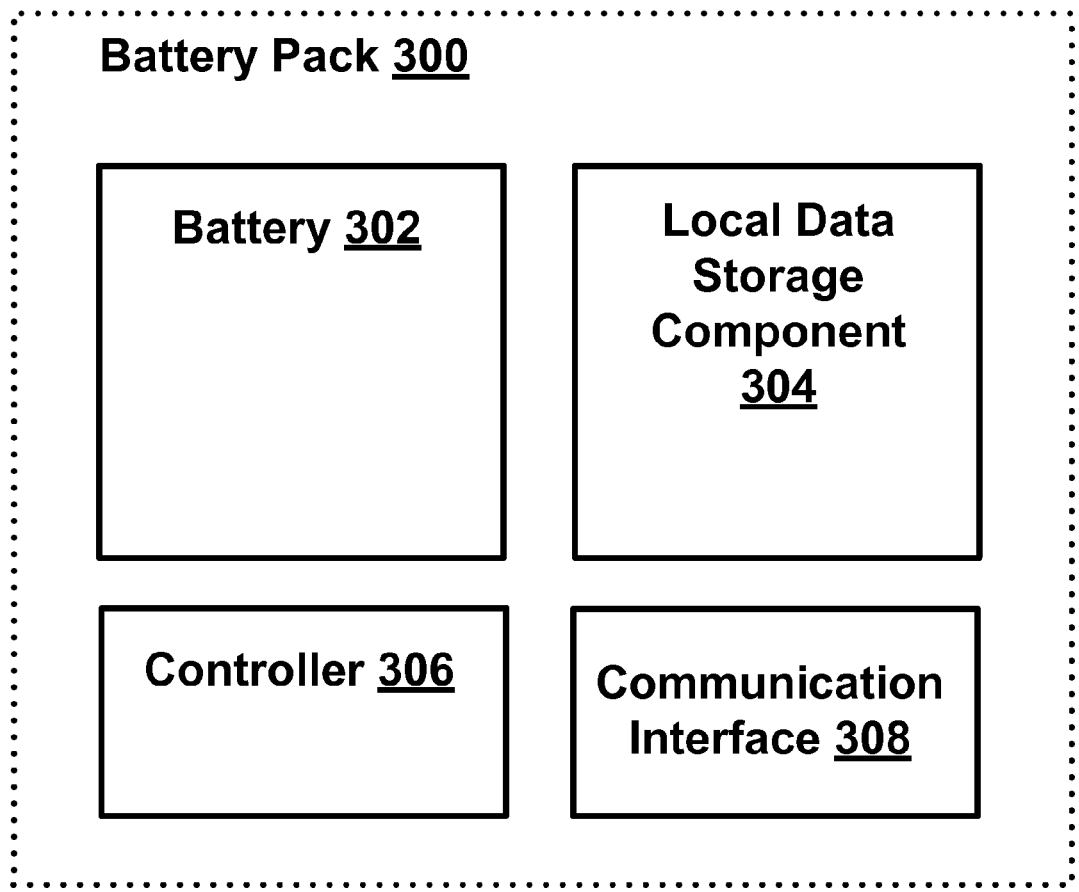
FIG. 3 is a block diagram of a battery pack, according to an example embodiment.

FIG. 3 is a block diagram of a battery pack, according to an example embodiment. More specifically, battery pack 300 may include the components illustrated in FIG. 3, including battery 302, local data storage component 304, controller 306, and communication interface 308. In further examples, battery pack 300 may include fewer or more components than those illustrated here, and certain components may also be combined or divided in other ways as well.

Battery 302 is a device configured to provide power to a mobile robotic device to allow the robot to operate within an environment. For instance, the battery 302 may be used to provide power for operation of electronics, actuators, and sensors on the robot. Additionally, battery 302 may be rechargeable so that a battery charger located at a battery exchange station can recharge the battery after it is depleted during operation of a robotic device. The battery 302 may include two or more electrochemical cells that convert stored chemical energy into electrical energy to power the robot. At the battery exchange station, a battery charger may apply electric current to the battery to reverse the chemical reactions that occur during use of the battery 302. Example types of rechargeable batteries that may be used include lithium ion batteries, NiMh batteries, NiCD batteries, NiZn batteries, and AgZn batteries. Other types of rechargeable batteries may be used as well.

Local data storage component 304 is device configured to store data acquired by a mobile robotic device during operation. In some examples, local data storage component 304 is a hard disk drive (HDD) that stores digital information using one or more rotating disks coated with magnetic material. In other examples, local data storage component 304 is a solid-state drive (SSD) that includes flash memory as the digital storage medium. In either case, the local data storage component 304 may be erasable so that the data acquired by a robot can be erased from the local data storage component 304 after the data has been transferred to a battery exchange station.

In further examples, the capacity of local data storage component 304 may correspond to the battery life of battery 302. In particular, local data storage component 304 may be large enough to store an amount of data expected to be acquired by a robot in an amount of time that the robot can operate using power from battery 302. For instance, if the battery life of batters 302 is 8 hours, the local data storage component 304 may be large enough to store 8 hours worth of data. In some examples, a fleet may employ different battery sizes (e.g., for different types of robots or robots performing different types of operations). Different hard drive capacities may be used to correspond to the different battery sizes. For instance, a first battery pack may include a battery with battery life of 2 hours and a hard drive with capacity to store 2 hours worth of data. A second battery pack may include a battery with battery life of 6 hours and a hard drive with greater capacity to store 6 hours worth of data.

Controller 306 is a computer that may facilitate connection with local data storage component 304 using communication interface 308. More specifically, controller 306 may use communication interface 308 to establish a hardline data channel between battery pack 300 and a robotic device that is carrying battery pack 300. Controller 306 may also use communication interface 308 to establish a separate hardline data channel between battery pack 300 and a port of a battery exchange station that is recharging battery 302. In some examples, communication interface 308 may be an Ethernet interface such as a circuit board or network card installed within battery pack 300. In further examples, communication interface 308 may use a number of different manners of data transmission hardware, including fiber optic, co-axial copper, or short-range wireless to transfer data to and from local data storage component 304.

Controller 306 may provide for disconnect and reconnect functionality to establish data channels to allow battery pack 300 to connect to control systems of different robots to allow for transfer of data to local data storage component 304. Controller 306 may also use this functionality to establish a data channel to allow battery pack 300 to transfer data out of local data storage component 304 to a data storage system of a battery exchange station. The controller 306 therefore enables access to local data storage component 304 without having to use a SATA (Serial ATA) interface, and the controller 306 may also facilitate connection to multiple different types of robots and/or other control systems. In further examples, battery 302 may also provide power to controller 306 as well.

In further examples, controller 306 may also serve as an abstraction layer on top of a management system of battery 302. Controller 306 may then facilitate access of battery state information by a robot carrying battery pack 300 and/or a battery exchange station to which battery pack 300 is attached. For instance, the management system of battery 302 may monitor and report the state of battery 302, which may include information such as voltage, temperature, charge level, etc. However, this reporting may be done by the battery management system using vendor-specific protocols for the battery 302. Within examples, controller 306 may provide a simple, standard protocol for a robotic device or a battery exchange station to access battery state information (e.g., using Transmission Control Protocol (TCP), Representation State Transfer (REST), or a different communications protocol). A robot or a battery exchange station may therefore be able access battery state information for batteries from a number of different vendors without having to be aware of different battery-specific protocols.

In some examples, battery pack 300 may be stored inside a tray in a robotic device, and the entire tray may be transferred to a port at the battery exchange station. In further examples, battery pack 300 may include a sealed container that contains each of the components of the battery pack 300. The sealed container may include one or more openings (e.g., to allow battery 302 or communication interface 308 to connect with a robot or a port of a battery exchange station). Other physical configurations involving a battery coupled to a hard drive as part of a battery pack may also be used.

Figure 4:
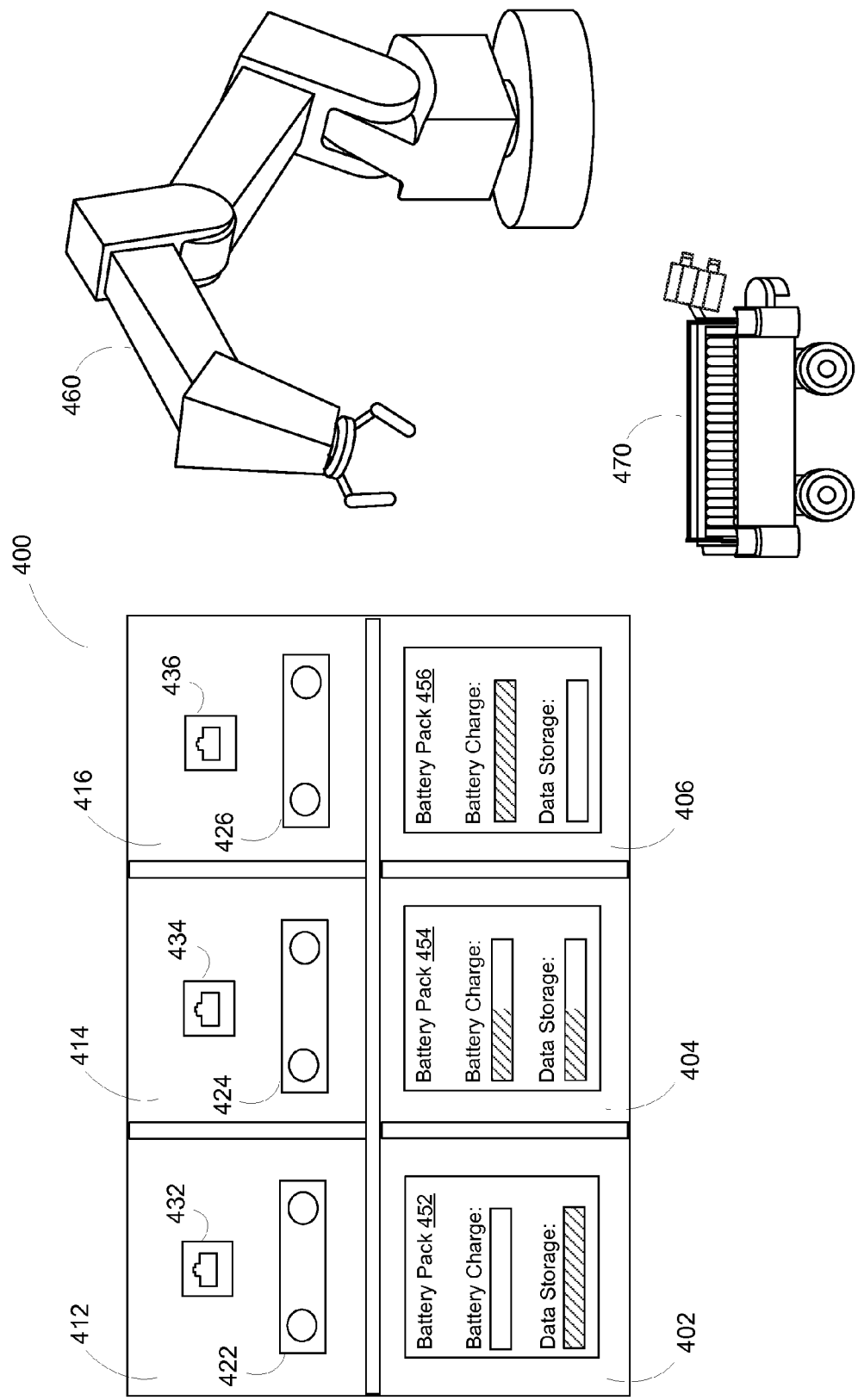
FIG. 4 illustrates a battery exchange station for robots, according to an example embodiment.

FIG. 4 illustrates a battery exchange station for robots, according to an example embodiment. More specifically, battery exchange station 400 may include a number of ports 402, 404, 406, 412, 414, and 416 for receiving battery packs from mobile robots, such as AGV 470. Ports 412, 414, and 416 are illustrated as currently empty (e.g., waiting to receive a battery pack with a depleted battery). As illustrated, each port contains a battery charger and a communication interface. In particular, port 412 includes battery charger 422 and Ethernet interface 432, port 414 includes battery charger 424 and Ethernet interface 434, and port 416 includes battery charger 426 and Ethernet interface 436. The battery chargers may be configured to charge batteries of battery packs attached to the ports while the communication interfaces are used to transfer data from hard drives of the battery parks to a data storage system of the battery exchange station (e.g., a separate hard drive). The battery chargers and communications interfaces may be positioned differently or take on different forms than those illustrated as well.

Ports 402, 404, and 406 are illustrated as containing battery packs in different states. In particular, port 402 may have received battery pack 452, which includes a depleted battery and full hard drive. Battery pack 452 may have just been provided to the battery exchange station 400 by a robot that used the battery of battery pack 452 for operation, such as AGV 470. Further, port 404 may have received battery pack 454 at an earlier point in time. Accordingly, the battery charger of port 404 may have partially charged the battery of battery pack 454 while the communication interface of port 404 transferred over a portion of the data stored on the hard drive of battery pack 454. Additionally, port 406 may have received battery pack 456 at an even earlier point in time. Accordingly, the battery charger of port 406 may have completely charged the battery of battery pack 456 while the communication interface of port 406 transferred over all of the data stored on the hard drive of battery pack 456. In this example, battery pack 456 may now be ready to be redeployed into the fleet (e.g., to AGV 470).

Within examples, the communication interface of each port may allow for establishment of a high enough bandwidth connection that all of the data from the hard drive of a battery pack may be transferred from the battery pack in the amount of time required by a battery charger of the port to fully recharge the battery. The communication interface of each port may use a number of different manners of data transmission hardware, including fiber optic, co-axial copper, or short-range wireless to transfer data from hard drives of attached battery packs.

In further examples, battery exchange station 400 may include multiple different types of ports with different types of battery chargers for different types of robots within a fleet. For instance, smaller ports may be used to charge batteries for AGV's while larger ports may be used to charge batteries for autonomous forklifts.

In some examples, battery exchange station 400 may also include a robotic arm 460 to move batteries between robots and ports at the exchange station. For instance, robotic arm 460 may be controlled to remove trays containing used battery packs from mobile robots such as AGV 470, and may then be controlled to attach the battery packs to available ports at the exchange station, such as ports 412-416. Robotic arm 460 may also be controlled to reattach battery packs with recharged batteries and empty hard drives to mobile robots at the station. In other examples, battery packs may be moved between robots and the exchange station in other manners besides using a robot arm as well.

In further examples, battery exchange station 400 may also contain a control system. The control system may use the communication interface of one of the ports to establish a data channel with a battery pack attached to the port. For instance, the control system of the exchange station may communicate with a local control system of the battery pack, such as controller 306 as described in reference to FIG. 3. The data channel may then be used to transfer data from the hard drive of the battery pack to a data storage system of the battery exchange station. After the data is transferred, it may be erased to free up memory for use by another robotic device in the future.

In additional examples, the control system may also be configured to determine which ports to attach received battery packs to, and also which available battery packs at the exchange station to provide to particular robots. In some examples, the control system may identify when battery packs are ready for redeployment based on the battery of the battery pack being recharged and the hard drive being empty. The control system may then identify a particular robot at the station to provide with the battery pack.

The control system may also employ various battery management strategies to determine which battery packs to provide to which robots as well. For instance, the control system may store usage data indicating usage histories of individual battery packs (e.g., time spent in particular robots). The control system may then use the usage data to determine how to deploy battery packs within a fleet. For instance, a battery pack with an underperforming battery may be identified and only deployed when no other battery packs are available.

In other examples, battery exchange station 400 may have multiple separate control systems. For instance, each port of the exchange station may have a separate control system to facilitate communication only with battery packs attached to the particular port. In further examples, each port may also have its own data storage component to receive transferred memory from the hard drives of individual battery packs. Each of the data storage components of the ports may then relay the data to a central data storage system (e.g., periodically or a chosen later point in time).

In some examples, the data storage system of a battery exchange station may be the central data storage system for a robotic fleet. The data storage system may therefore collect and locally store data acquired by a number of robots over time. In other examples, the data storage system of a battery exchange station may serve as a temporary cache to hold data acquired by robots until the data can be transferred to a different location. For instance, the data may be transferred from the temporary cache to a remote central data storage system over a wireless network at rates and/or times that would not interfere with other wireless network traffic (e.g., from robots communicating with each other). A temporary cache at the battery exchange station may therefore allow for fast transfer of data off of robots while batteries are recharged, and also allow the data to be transferred wirelessly to a remote location at a later chosen time without disrupting operation of a robotic fleet.

Figure 5:
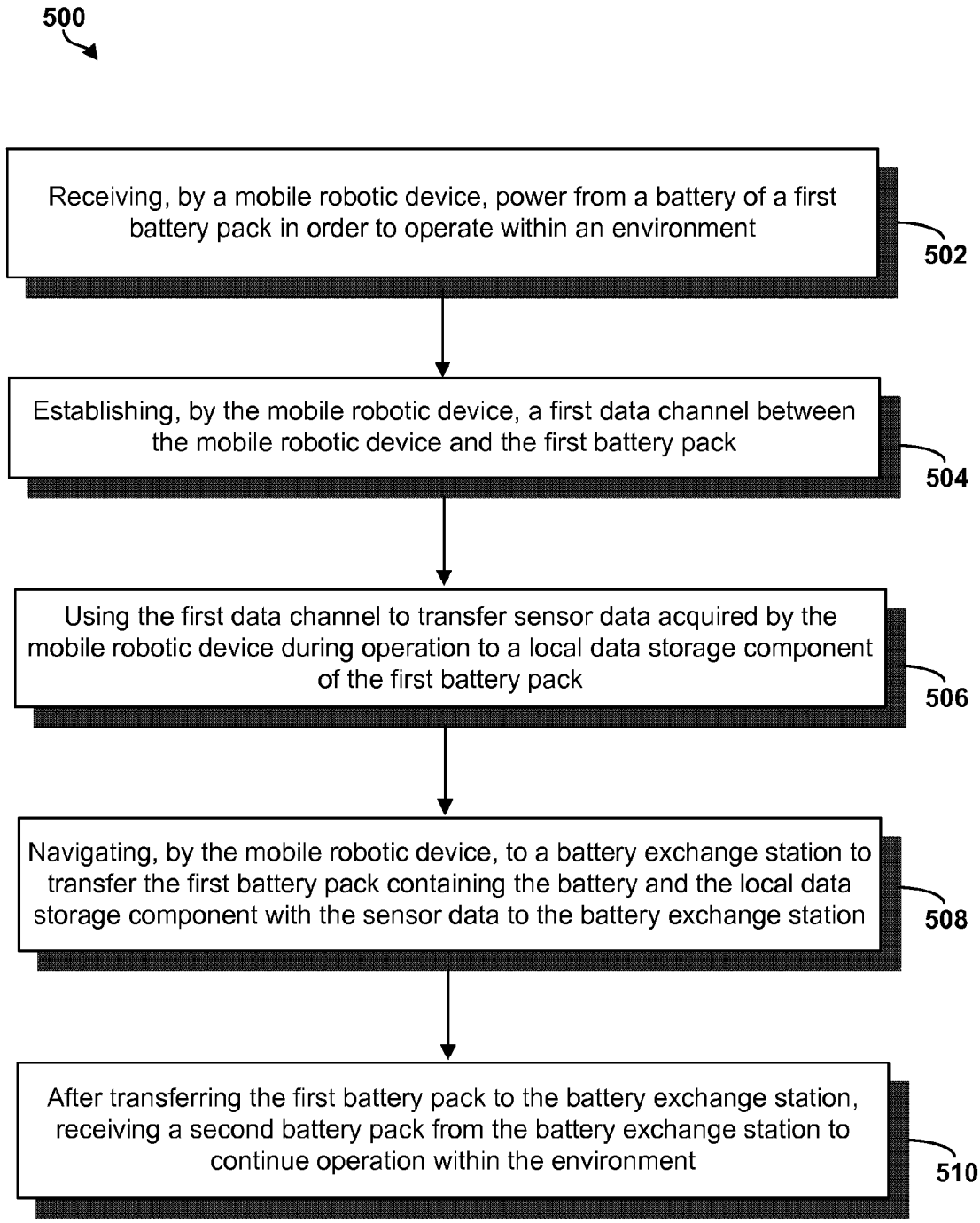
FIG. 5 is a block diagram of a method, according to an example embodiment.

FIG. 5 includes a flowchart showing a method 500 that may allow for operation by a mobile robotic device within an environment, according to an example embodiment. Method 500 may be carried out by any of the mobile robotic devices illustrated and described previously with respect to FIGS. 1A-1B and/or 2A-2D. Additionally, part or all of method 500 may be carried out by a local control system of such a robotic device. In further examples, method 500 may be executed by a number of different possible types of mobile autonomous devices or vehicles as well. In further examples, part or all of method 500 may be executed by a remote control system in communication with one or more robotic devices as well, such as global control system 150 as described with respect to FIG. 1B.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may involve a mobile robotic device receiving power from a battery of a first battery pack in order to operate within an environment. For instance, the battery may provide power for the robot to navigate, for the robot's control systems to function, and for the robot's sensors to receive sensor data during operation. The robot may perform any number of different functions while operating with the first battery pack. In some examples, the robot may be one of the types of mobile robots performing operations for a warehouse fleet of robots as previously described.

Figure 6A:
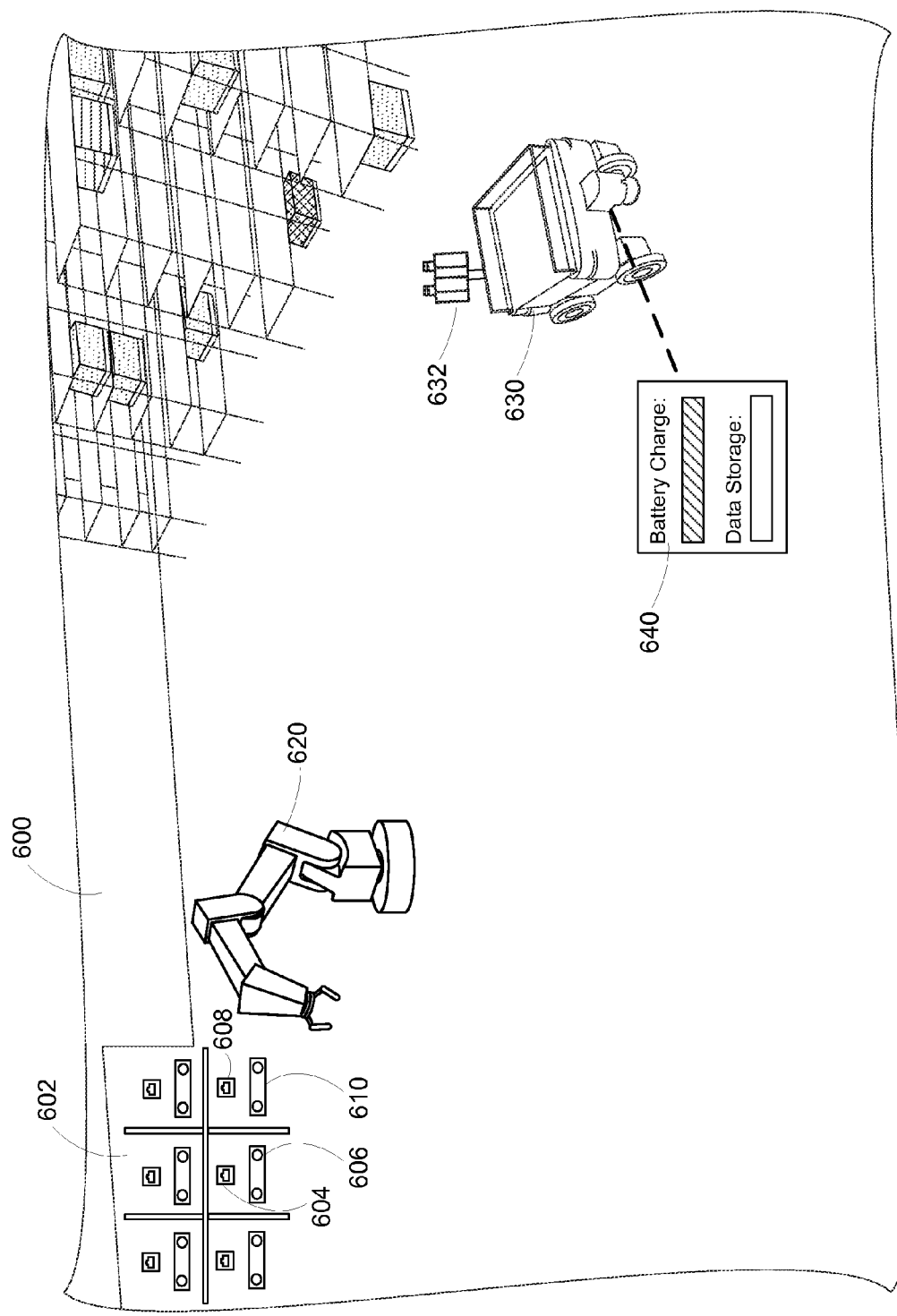

FIG. 6A illustrates an example of a mobile robotic device carrying a battery pack within a warehouse setting, according to an example embodiment. More specifically, robot 630 may be provided with a battery pack 640 that includes both a battery and a hard drive for data storage. As shown, battery pack 640 may initially contain a fully charged battery and an empty data storage component. The robot 630 may also have any number of different sensors for collecting information from the environment, such as stereo camera 632.

The robot 630 may be controlled to operate within warehouse 600. For instance, the robot 630 may pick up and carry boxes between different locations in the warehouse 600. The warehouse 600 may also include a battery exchange station 602, with a number of ports such as described in reference to FIG. 4. For instance, one available port may include communication interface 604 and battery charger 606, and a second available port may include communication interface 608 and battery charger 610. The warehouse 600 may also include a fixed robotic arm 620 located at the exchange station 602 to move battery packs between individual mobile robots and the exchange station 602.

Referring back to FIG. 5, method 500 may further involve the mobile robotic device establishing a first data channel between the mobile robotic device and the first battery pack, as shown by block 504. More specifically, a control system of the robotic device may communicate with a local control system of the battery pack using a communication interface, such as an Ethernet interface. The data channel may be used for continuous or periodic transmission of data between the robotic device and the battery pack.

Method 500 may further involve the robotic device using the first data channel to transfer sensor data acquired by the mobile robotic device during operation to a local data storage component of the first battery pack, as shown by block 506. More specifically, the sensor data may be data indicative of the environment acquired by depth sensors, visual sensors, and/or other types of sensors on the robot as the robot moves about in the environment. The transfer of data may occur simultaneous to the robotic device receiving power from the battery of the battery pack to continue operation within the environment.

In some examples, sensor data may be continuously transferred from the mobile robot to the battery pack as it received. In other examples, the data may first be processed by a control system of the mobile robot. For instance, the data may be processed to determine only certain portions of the data to log by storing to the hard drive of the battery pack. In one example, the mobile robot may identify errors in operation, and store log data acquired around the time of the identified errors to the hard drive of the battery pack (e.g., to help with debugging errors at a later point in time).

Figure 6B:
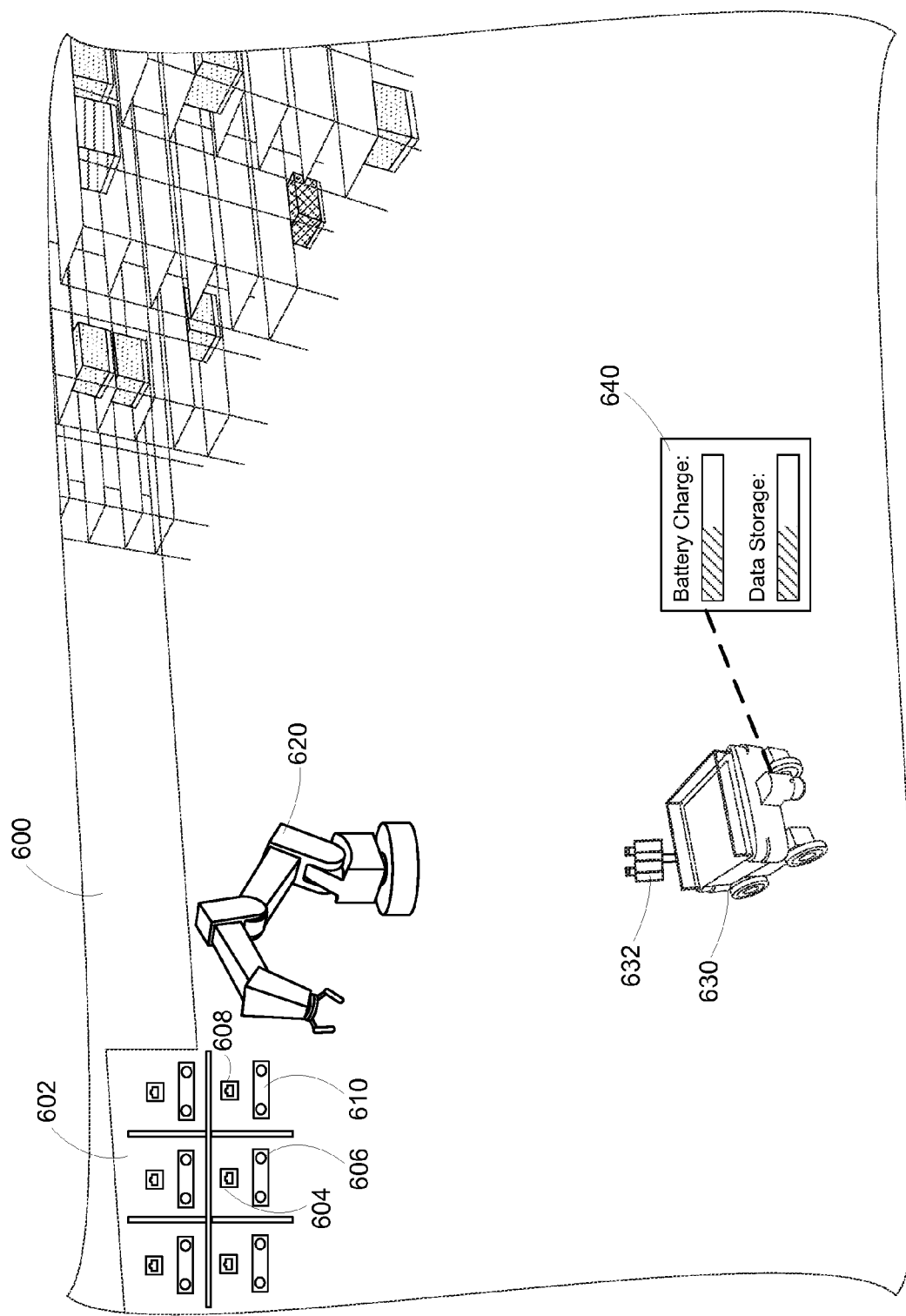

FIG. 6B illustrates the mobile robot from FIG. 6A at a later point in time, according to an example embodiment. More specifically, after the mobile robot 630 has operated for some time with battery pack 640, the battery of battery pack 640 may be partially depleted as illustrated. Additionally, the data storage component of battery pack 640 may be partially filled. For instance, sensor data from stereo sensor 632 on mobile robot 630 may be transferred to the data storage component of battery pack 640. In one example, every frame of data captured by stereo sensor 632 may be logged to the data storage component of battery pack 640. By using a hardline connection to eventually capture this data at the battery exchange station, a large amount of data can eventually be recovered by a control system of the fleet, which may be infeasible if relying only on a wireless connection with robot 630.

Referring back to FIG. 5, method 500 may further involve the robotic device navigating to a battery exchange station, as shown by block 508. More specifically, the robotic device may navigate to the exchange station to transfer the first battery pack including its battery and local data storage component to the battery exchange station. The battery may then be recharged as sensor data from the robot that is stored on the local data storage component is transferred out of the local data storage component of the battery pack.

In some example, the robotic device may navigate to the battery exchange station in response to determining that the battery in its battery pack is depleted (e.g., below a threshold level of charge). In other examples, the robotic device may navigate to the battery exchange station in response to determining that hard drive of the battery pack is full (e.g., below a threshold amount of available remaining memory).

FIG. 6C illustrates the mobile robot from FIG. 6B at a later point in time, according to an example embodiment. More specifically, after the mobile robot 630 operates within the warehouse 600 for a certain period of time, the battery of battery pack 640 may become depleted as the hard drive of the battery pack 640 becomes full with data acquired by the robot 630. The robot 630 may then navigate to battery exchange station 602 to drop off battery pack 640 so that the battery in battery pack 640 can be recharged and the stored sensor data can be recovered (e.g., to a data storage system coupled to the battery exchange station 602). For instance, battery pack 640 may be physically transferred by robotic arm 620 to the available port at the exchange station that contains communication interface 608 and battery charger 610. Communication interface 608 may then be used to transfer stored data from the data storage component of battery pack 640 (e.g., using a wired or other type of hardline physical data connection) while battery charger 610 recharges the battery of battery pack 640.

Referring back to FIG. 5, method 500 may further involve the mobile robotic device receiving a second battery pack from the battery exchange station to continue operation within the environment, as shown by block 510. More specifically, after transferring the first battery pack containing a depleted battery and/or full data storage component to the exchange station, the robotic device may then receive another battery pack with a recharged battery and empty hard drive. Accordingly, the robotic device can continue operation within the fleet without having to wait for the battery that it used previously to be recharged, and without having to wait for the hard drive that it used previously for storing sensor data to be emptied.

As shown in FIG. 6C, an available battery pack 650 may be available at battery exchange station 602. In particular, another robot may have dropped off battery pack 650, and the battery of battery pack 650 may have been recharged at station 602 as the hard drive of battery pack 650 was emptied of stored data. Accordingly, robot arm 620 may be controlled (e.g., by a control system of the exchange station 602) to pick up available battery pack 650 and transfer it into robot 630.

FIG. 6D illustrates the mobile robot from FIG. 6C at a later point in time, according to an example embodiment. More specifically, after receiving battery pack 650 from exchange station 602, robot 630 may continue operation within warehouse 600. In particular, robot 630 may now receive power from the battery of battery pack 650, and establish a new data channel to transfer sensor data to the hard drive of battery pack 650. Meanwhile, the battery pack 640 previously used by robot 630 may be processed by exchange station 602 in order to get battery pack 640 ready for redeployment. In particular, the battery of battery pack 640 may be recharged while the sensor data previously collected by robot 630 is recovered from the hard drive of battery pack 640. Once the battery of battery pack 640 is recharged and the hard drive of battery pack 640 is emptied, battery pack 640 may be provided to another robot in the fleet.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
receiving, by a mobile robotic device, power from a battery of a first battery pack in order to operate within an environment;
establishing, by the mobile robotic device, a first data channel between the mobile robotic device and the first battery pack;
using the first data channel to transfer sensor data acquired by the mobile robotic device during operation to a local data storage component of the first battery pack;
navigating, by the mobile robotic device, to a battery exchange station to transfer the first battery pack containing the battery and the local data storage component with the sensor data to the battery exchange station;
after transferring the first battery pack from the mobile robotic device to the battery exchange station, capturing and erasing, by the battery exchange station, the sensor data from the local data storage component of the first battery pack while charging the battery of the first battery pack; and
receiving, by the mobile robotic device, a second battery pack from the battery exchange station to continue operation within the environment.

2. The method of claim 1, further comprising:
determining that the battery of the first battery pack is depleted; and
in response to determining that the battery of the first battery pack is depleted, navigating to the battery exchange station.

3. The method of claim 1, further comprising:
determining that the local data storage component of the first battery pack is full; and
in response to determining that the local data storage component of the first battery pack is full, navigating to the battery exchange station.

4. The method of claim 1, further comprising:
receiving power from a battery of the second battery pack in order to continue operation within the environment;
establishing a second data channel between the mobile robotic device and the second battery pack; and
using the second data channel to transfer sensor data acquired by the mobile robotic device during continued operation to a local data storage component of the second battery pack.

5. The method of claim 1, further comprising:
establishing the first data channel by communicating with a local control system of the first battery pack.

6. The method of claim 1, further comprising:
identifying an error in robotic operation; and
in response to identifying the error in robotic operation, using the first data channel to transfer sensor data acquired by the mobile robotic device during a period of time when the error was identified to the local data storage component of the first battery pack.

7. A battery exchange station, comprising:
a data storage system;
a plurality of ports for receiving battery packs from mobile robotic devices, wherein a port comprises:
a battery charger to charge a battery of a battery pack that is coupled to the port; and
a communication interface to transfer data from a local data storage component of the battery pack to the data storage system; and
a control system configured to:
cause the communication interface of a given port of the plurality of ports to establish a data channel with a given battery pack that is coupled to the given port; and
use the data channel to transfer stored sensor data from a local data storage component of the given battery pack to the data storage system and erase the stored sensor data from the local data storage component of the given battery pack while charging a battery of the given battery pack with the battery charger of the given port at the battery exchange station.

8. The battery exchange station of claim 7, wherein the control system is further configured to:
   determine that a battery of a particular battery pack has been recharged, wherein the particular battery pack is coupled to a particular port of the plurality of ports;
   determine that a local data storage component of the particular battery pack has been emptied; and
   after determining that the battery of the particular battery pack has been recharged and that the local data storage component of the particular battery pack has been emptied, cause the particular battery pack to be transferred to a first robot located proximate to the battery exchange station.

9. The battery exchange station of claim 8, wherein the particular battery pack was received at the particular port from a second robot different from the first robot.

10. The battery exchange station of claim 7, further comprising a robotic manipulator, wherein the robotic manipulator is configured to:
    remove a particular battery pack from a mobile robotic device located proximate to the battery exchange station; and
    attach the particular battery pack to at least one available port of the plurality of ports.

11. The battery exchange station of claim 7, wherein the plurality of ports comprise a plurality of types of battery chargers to charge batteries for a corresponding plurality of different types of mobile robotic devices within a fleet of robotic devices.

12. The battery exchange station of claim 7, wherein the control system is further configured to cause the communication interface of the given port to communicate with a local control system of the given battery pack.

13. The battery exchange station of claim 7, wherein the control system is further configured to:
    store usage data indicative of usage histories of individual battery packs; and
    based on the usage data, select particular battery packs with recharged batteries and empty local data storage components to transfer to particular mobile robotic devices located proximate to the battery exchange station.

14. The battery exchange station of claim 7, wherein the communication interface of each of the plurality of ports comprises an Ethernet interface.

15. A battery pack, comprising:
    a battery configured to provide power to a robot;
    a local data storage component configured to store data acquired during robotic operation; and
    a controller configured to:
       establish a first data channel between the battery pack and a given robot while the battery pack is physically coupled to the given robot such that the battery of the battery pack provides power to the given robot;
       use the first data channel to transfer sensor data from the given robot to the local data storage component of the battery pack for storage;
       establish a second data channel between the battery pack and a battery exchange station while the battery pack is physically coupled to the battery exchange station to charge the battery of the battery pack by the battery exchange station; and
       use the second data channel to transfer the sensor data stored in the local data storage component of the battery pack to the battery exchange station and erase the sensor data from the local data storage component of the battery pack while the battery of the battery pack is charged by the battery exchange station.

16. The battery pack of claim 15, further comprising a sealed container that contains the battery, the local data storage component, and the controller.

17. The battery pack of claim 15, wherein a battery life of the battery corresponds to a size of the local data storage component, such that the local data storage component is large enough to store an amount of data acquirable during robotic operation over a period of time indicated by the battery life of the battery.

18. The battery pack of claim 15, wherein the battery of the battery pack is further configured to provide power to the controller of the battery pack.

19. The battery pack of claim 15, further comprising an Ethernet interface to establish the first data channel and the second data channel.

20. The battery pack of claim 15, wherein the controller is further configured to:
    after the battery is recharged and the local data storage component is emptied at the battery exchange station, establish a third data channel between the battery pack and a different robot while the battery pack is physically coupled to the different robot such that the battery of the battery pack provides power to the different robot; and
    use the third data channel to transfer data from the different robot to the local data storage component of the battery pack for storage.

* * * * *